United States Patent
Bertuccio et al.

(10) Patent No.: US 12,025,759 B2
(45) Date of Patent: Jul. 2, 2024

(54) RADIATION DETECTION APPARATUS

(71) Applicant: Politecnico di Milano, Milan (IT)

(72) Inventors: Giuseppe Bertuccio, Milan (IT); Filippo Mele, Milan (IT); Massimo Gandola, Milan (IT)

(73) Assignee: POLITECNICO DI MILANO, Milan (IT)

( * ) Notice: Subject to any disclaimer, the term of this patent is extended or adjusted under 35 U.S.C. 154(b) by 223 days.

(21) Appl. No.: 17/787,827

(22) PCT Filed: Dec. 15, 2020

(86) PCT No.: PCT/IB2020/061965
§ 371 (c)(1),
(2) Date: Jun. 21, 2022

(87) PCT Pub. No.: WO2021/130608
PCT Pub. Date: Jul. 1, 2021

(65) Prior Publication Data
US 2023/0341569 A1 Oct. 26, 2023

(30) Foreign Application Priority Data
Dec. 23, 2019 (IT) .......................... 102019000025402

(51) Int. Cl.
*G01T 1/24* (2006.01)
(52) U.S. Cl.
CPC .................................. *G01T 1/241* (2013.01)
(58) Field of Classification Search
CPC ............ G01T 1/241; G01T 1/40; G01T 1/247
See application file for complete search history.

(56) References Cited

U.S. PATENT DOCUMENTS

| | | | | |
|---|---|---|---|---|
| 5,322,995 A | * | 6/1994 | Ohkawa | H03F 3/082 327/345 |
| 5,347,231 A | * | 9/1994 | Bertuccio | H03F 1/302 330/311 |

(Continued)

FOREIGN PATENT DOCUMENTS

| | | |
|---|---|---|
| CN | 105842726 A | 8/2016 |
| WO | 2008014086 A2 | 1/2008 |

OTHER PUBLICATIONS

International Search Report dated Feb. 2, 2021; 2 pages.
Written Opinion dated Feb. 2, 2021; 7 pages.

*Primary Examiner* — David P Porta
*Assistant Examiner* — Gisselle M Gutierrez
(74) *Attorney, Agent, or Firm* — Mark Malek; Widerman Malek, PL (57) ABSTRACT

A charge detection apparatus may include a radiation sensor having a first electrode and a second electrode for collecting charges of opposite sign and configured to supply to a collecting terminal, connected to the first electrode, a charge signal proportional to an incident radiation. The radiation sensor may define a sensor capacitance associated with the first and the second electrode. The device may also include a charge preamplifier, configured to receive the charge signal and convert it into an electrical output signal, and including an amplifier having a first output terminal. An electrical connection may be included between the first output terminal and the second electrode configured so that the sensor capacitance is in feedback for the amplifier.

15 Claims, 4 Drawing Sheets

(56) References Cited

U.S. PATENT DOCUMENTS

| | | | |
|---|---|---|---|
| 9,411,054 B2* | 8/2016 | Fiorini | .................. G01T 1/17 |
| 9,768,737 B2* | 9/2017 | Fiorini | ............... H03F 3/45475 |
| 10,554,178 B2* | 2/2020 | Fiorini | .................. H03F 1/26 |
| 11,604,292 B2* | 3/2023 | Mele | .................. G01T 1/247 |
| 2008/0217543 A1 | 9/2008 | Rohde | |
| 2014/0217285 A1* | 8/2014 | Fiorini | ................ H03F 3/087 |
| | | | 250/336.1 |
| 2015/0214901 A1* | 7/2015 | Fiorini | .................. H03F 3/08 |
| | | | 330/291 |
| 2018/0006613 A1* | 1/2018 | Fiorini | .................. H03F 3/70 |
| 2021/0396893 A1* | 12/2021 | Mele | .................. G01T 1/247 |
| 2021/0405224 A1* | 12/2021 | Kim | .................. H03F 3/70 |

* cited by examiner

RADIATION DETECTION APPARATUS

RELATED APPLICATIONS

This application is a national phase application of and claims priority under 35 U.S.C. § 371 of PCT Application Serial No. PCT/162020/061965 filed on Dec. 15, 2020 and titled RADIATION DETECTION APPARATUS, which claims the benefit of IT 102019000025402, filed on Dec. 23, 2019, each of which is hereby incorporated by reference in its entirety.

TECHNICAL FIELD

The present invention refers to radiation detection apparatuses using a charge preamplifier.

STATE OF THE ART

As is well known, the Charge Sensitive Amplifier CSA can be schematized as a low noise preamplifier with a feedback capacitance placed between the input and output of the amplifier itself and which functions as an integrator for the current signal at its input.

In typical applications the charge preamplifier is used in radiation measurement apparatuses and, therefore, receives as input the current signal generated by a radiation sensor. This sensor, when crossed by radiation, produces a charge signal proportional to the energy of the absorbed radiation. Typically the amount of charge generated by the sensors, for example for X-rays, is extremely limited (from a few hundred to a few tens of thousands of electrons). The electric charge, carried by means of a suitable electric field (Drift Field) towards the detector's collection electrode, induces a current signal as known from the Shockley-Ramo Theorem. The charge preamplifier receives this current signal as input and converts it into a voltage signal proportional to the electrical charge generated. This voltage signal is used by further processing stages in order to generate, for example, an energy spectrum and/or a radiation time distribution.

Note that the noise generated by the amplifier is fed back into the preamplifier itself in the form of an equivalent voltage and current noise generator. The noise of a charge preamplifier is commonly expressed in terms of Equivalent Noise Charge (ENC), which has a component proportional to the total capacitance at the preamplifier input.

In this regard, document E. Gatti, P. F. Manfredi, M. Sampietro, V. Speziali, "Suboptimal filtering of 1/f-noise in detector charge measurements", Nuclear Instruments and Methods in Physics Research Section A: Accelerators, Spectrometers, Detectors and Associated Equipment"; Volume 297, edition 3 1990, pages 467-478, ISSN 0168-9002, https://doi.org/10.1016/0168-9002(90) 91331-5 discusses some methods of signal and noise processing in charge preamplifiers.

A reduction in the input capacitance of the charge preamplifier therefore leads to a reduction in the ENC, and consequently to an improvement in the signal-to-noise ratio and the energy or time resolution of the measuring equipment.

Figure 1:
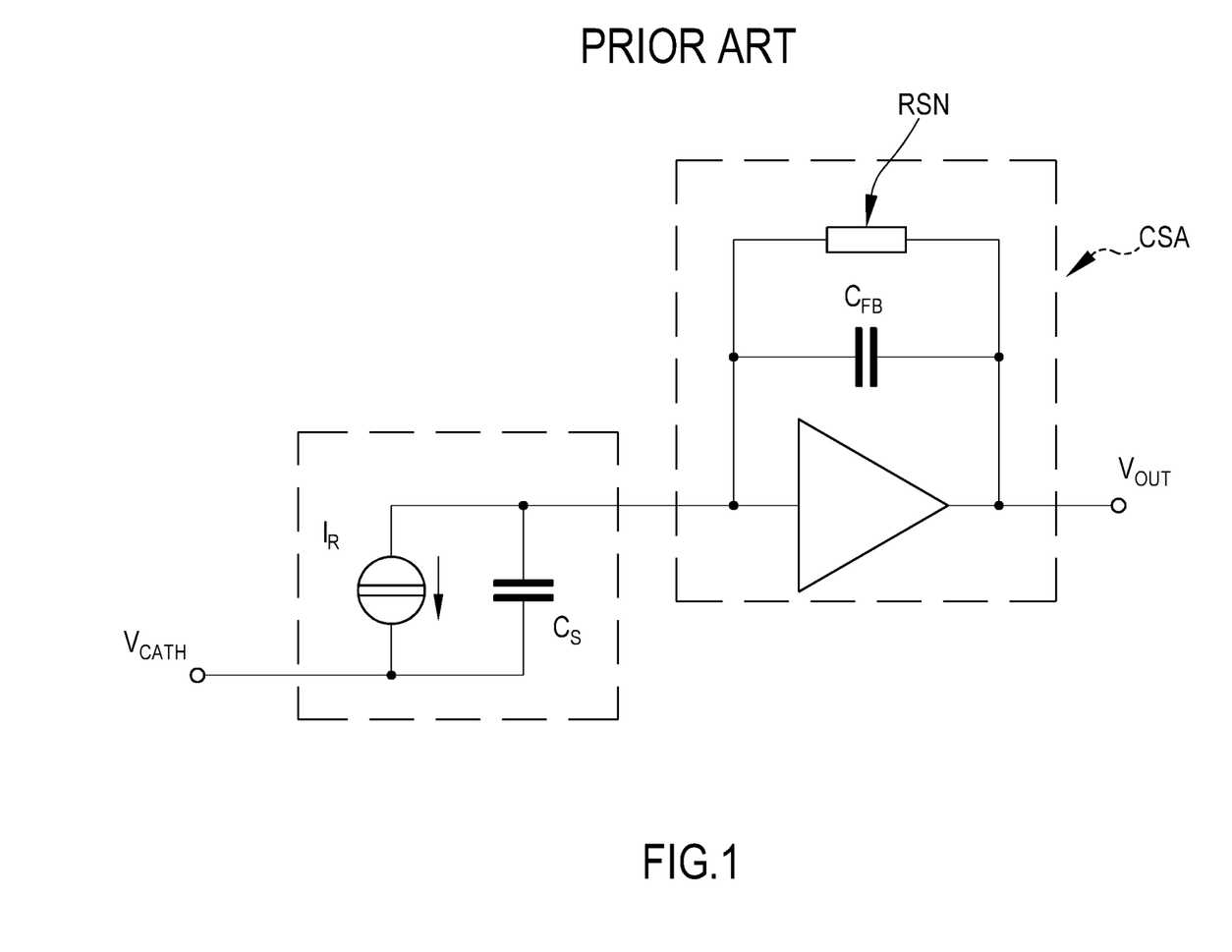
FIG. 1 shows a circuit diagram of a radiation detector made according to the prior art.

A typical realization of a detection apparatus according to known art is shown in FIG. 1 (Prior Art). In this figure, the radiation detector or radiation sensor is modelled using an current pulse generator IR, whose integral over time represents the charge generated by the ionising radiation, and a $C_S$ capacitor representing the measurable geometric capacitance of the detector charge collection electrode and the ground.

An external voltage generator biasis one of the detector electrodes at a constant voltage—in the example $V_{CATH}$. Downstream of the detector, the charge preamplifier CSA integrates the IR current on the capacitance $C_{FB}$.

A reset network RSN, connected in parallel to the capacitance $C_{FB}$, has the function to discharge the capacitance $C_{FB}$ in continuous or pulsed mode in order to avoid saturation of the amplifier. The reset network can include a feedback resistor, a pulsed reset switch or any general discharge power supply. Examples of electrical discharge networks that can be used in a charge preamplifier are described in the following documents:

F. Krummenacher "Pixel detector with local intelligence: an IC designer point of view" Nuclear Instruments and Method in Physics Research A305 (1991) 527-532;

G. Gramegna, P. O'Connor, P. Rehak, S. Hart "CMOS preamplifier for low-capacitance detectors" Nuclear Instruments and Method in Physics Research A390 (1997) 241-250.

Further documents useful for the understanding of this invention and the problems related to radiation detection equipment are indicated below:

P. O'Connor, G. Gramegna, P. Rehak, F. Corsi, C. Marzocca, "CMOS Preamplifier with High Linearity and Ultra Low Noise for X-Ray Spectroscopy", IEEE Trans. Nucl. Sci., vol. 44, pp. 318-325, June 1997;

G. Bertuccio, S. Caccia, "Progress in ultra-low-noise ASICs for radiation detectors", Nuclear Instruments and Methods in Physics Research A 579, pp. 243-246, 2007;

G. Bertuccio, S. Caccia, "Noise Minimization of MOSFET Input Charge Amplifiers based on ΔN and Δμ 1/f Models", IEEE Transactions on Nuclear Science, Vol. 56, no. 3, 2009, pp. 1511-1520.

In particular, the following document is useful for the understanding of the present invention and the problems related to silicon drift detectors SDD (or Semiconductor Drift Chamber—SDC): E. Gatti and P. Rehak, Semiconductor drift chamber—an application of a novel charge transport scheme, Nucl. Instrum. Meth. 225 (1984) 608.

Document CN105842726 discloses a cadmium zinc telluride (CdZnTe) X-ray detector for nitrogen thermoelectric cooling.

Document WO2020/109924 describes a charge preamplifier device integrated in a chip of semiconductive material.

Document US2008/217543 discloses an energy dispersive X-Ray I-FET SDD detector and a method for pulsed reset neutralization of accumulated charges.

SUMMARY OF THE INVENTION

The present invention faces the problem of providing a radiation detector having a charge preamplifier that is alternative to the known ones and that allows, for example, a reduction in the input capacitance of the charge preamplifier compared to what can be obtained with traditional techniques.

The Applicant has perceived that it is possible to exploit the capacitance associated with the radiation detector, i.e. its parasite capacitance present at the charge collection electrode, by connecting it so that it acts as a feedback capacitor for the charge preamplifier. In this way it is possible to obtain, for example, a reduction in the input capacitance of the charge preamplifier with the resulting benefits, mentioned above.

The present invention has as its object a radiation detection apparatus as described in claim 1 and its particular embodiments as defined in claims 2-15.

BRIEF DESCRIPTION OF THE DRAWINGS

This invention is described in detail below, by way of example and without limitation, with reference to the attached drawings.

DETAILED DESCRIPTION

While the invention is susceptible to various modifications and alternative constructions, some particular forms of construction are shown in the drawings and will be described in detail below. In this description, similar or identical elements or components will be shown in the figures with the same identifying symbol.

Figure 2:
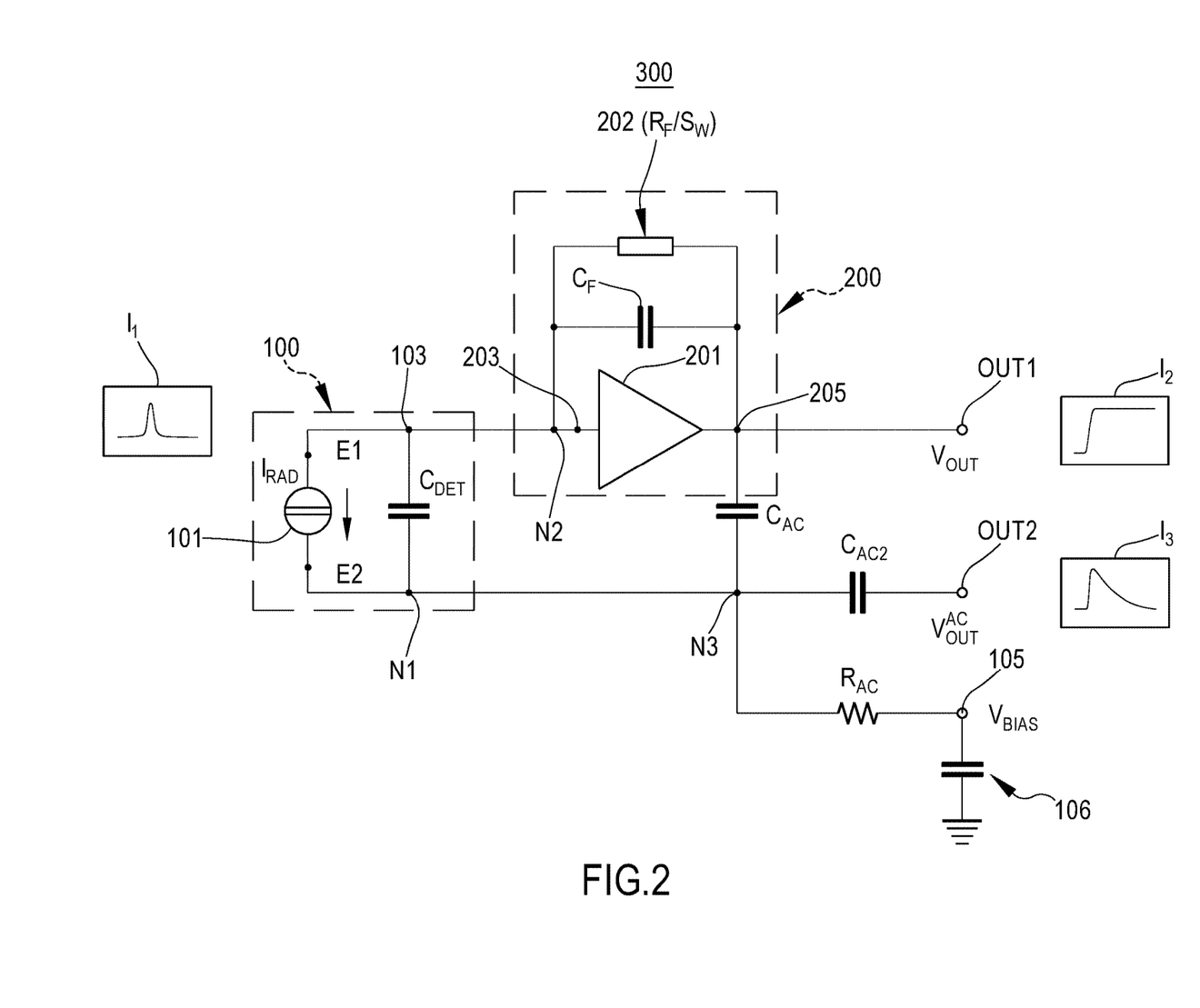
FIG. 2 shows a circuit diagram, according to a form of implementation, of a radiation detection apparatus including a radiation sensor and a charge preamplifier.

FIG. 2 schematically shows an embodiment of a detection apparatus 300 including a radiation sensor 100 and a charge preamplifier 200. The radiation sensor 100 is such that when crossed by radiation (such as electromagnetic radiation or ionising radiation, which may contain ionising particles) it produces a charge signal $S_{CH}$ proportional to the energy of the absorbed radiation.

The charge preamplifier 200 is configured to receive the charge signal $S_{CH}$ at its input and convert it into an electrical output signal, such as a voltage signal.

In particular, the radiation sensor 100 is a semiconductor sensor comprising a first electrode E1 (e.g. an anode) and at least a second electrode E2 (e.g. a cathode) collecting the charge carriers (electrons and holes) generated by the radiation incident on the semiconductor material and moved under the action of an electric field, within a deplation region. As an example, the radiation sensor 100 is a sensor of known type such as a Semiconductor (or Silicon) Drift Detector (SDD) or a Pixel Detector.

In FIG. 2, the radiation sensor 100 has been schematically shown by means of a pulse generator 101 of electric current $I_{RAD}$ connected between a collection terminal 103, connected to the first electrode E1 of the radiation sensor 100 and a first node N1, connected to the second electrode E2 of the radiation sensor 100. Note that generator 101 can also provide a constant current contribution, in addition to the pulses $I_{RAD}$, which models a leakage current (or dark current) of the radiation sensor at collection terminal 103.

The first node N1 is also connected, through a first bias resistor $R_{AC}$, to a bias terminal 105, which in turn can be connected to a voltage generator 106 configured to provide a bias direct voltage $V_{BIAS}$. The voltage generator 106 is, according to an example, an external component of both the radiation sensor 100 and the charge preamplifier 200 and allows generating the electric field to which the charge carriers are subjected in the deplation region of the radiation sensor 100.

According to the schematisation in FIG. 2, the radiation sensor 100 also includes a capacitor $C_{DET}$ connected between the collection terminal 103 and the first node N1, i.e., between the first electrode E1 and the second electrode E2 of the radiation sensor 100. This capacitor $C_{DET}$ represents a corresponding capacitance associated with the radiation sensor 100 and is indicative of a capacitance that is generated between the anode and a cathode of the detector itself. Furthermore, the capacitance $C_{DET}$ can also incorporate capacitive effects associated with the anode and other electrical contacts of the radiation sensor 100. The capacitance $C_{DET}$ is a capacitance dependent on the structure and geometric shape of the radiation sensor 100 and according to the known technique is evaluated as a parasitic capacitance.

The charge preamplifier 200 includes an amplifier 201 equipped with an input terminal 203 and an output terminal 205. Input terminal 203 is connected to a second node N2, which in turn is connected to collection terminal 103 of radiation sensor 100. Therefore, the input terminal 203 of the amplifier 201 is connected to one of the ends of the capacitor $C_{DET}$. The output terminal 205 is connected to a first output terminal OUT1, which represents a terminal from which a first electrical output signal (such as a first output voltage $V_{OUT}$) of the amplifier 201 and then of the charge preamplifier 200 can be picked up.

Moreover, the first output terminal OUT1 of amplifier 201 is also electrically connected (in particular, for variable signals) to the first node N1, to which the second electrode E2 of the radiation sensor 100 is connected, i.e., according to the modelling adopted, to another of the ends of the capacitor $C_{DET}$. In this way, the capacitor $C_{DET}$ is in feedback for amplifier 201, as it is connected between the input terminal 203 and the first output terminal OUT1.

More specifically, the electrical connection of the first output terminal OUT1 to the first N1 node is made by means of a coupling capacitor $C_{AC}$ that blocks the DC voltage and makes a variable voltage coupling. In particular, the coupling capacitor $C_{AC}$ is connected between an output terminal 205 and a third node N3, in turn connected to the first node N1 and the bias resistor $R_{AC}$.

Note that amplifier 201 is preferably low noise and may include a known type of amplifier such as a single input amplifier. Alternatively, amplifier 201 can be a differential input amplifier such as an operational amplifier.

In addition, according to an example, the charge preamplifier 200 includes an electrical discharge component 202 connected to the second node N2 and then to input terminal 203. In some projects, the electrical discharge component 202 can be connected between the output terminal 205 and the second node N2, thus resulting in feedback for the amplifier 201.

The electric discharge component 202 can include an feedback resistor $R_F$, a pulsed reset switch SW or a discharge electrical network, of a type known to the technician of the sector. Examples of electrical discharge networks that can be used in the detector apparatus 300 are described in the following documents, already mentioned:

F. Krummenacher "Pixel detector with local intelligence: an IC designer point of view" Nuclear Instruments and Method in Physics Research A305 (1991) 527-532;

G. Gramegna, P. O'Connor, P. Rehak, S. Hart "CMOS preamplifier for low-capacitance detectors" Nuclear Instruments and Method in Physics Research A390 (1997) 241-250.

The charge preamplifier 200 can also be equipped with an optional feedback capacitor $C_F$ (having capacitance $C_F$)

connected between the output terminal 205 and the second node N2, resulting in feedback for the 201 amplifier.

Note that the described detection apparatus 300, in addition or instead of the first output terminal OUT1, can have a second output terminal OUT2 connected (in particular, by means of an additional coupling capacitor $C_{AC2}$) 10 to the third node N3. At the second output terminal OUT2, a second electrical output signal of the detection sensor 100, such as a second output voltage $V^{AC}_{OUT}$, can be withdrawn.

The charge preamplifier 200 can be made in a semiconductor material plate according to CMOS (Complementary-Metal-Oxide Semiconductor) technology, or according to BiCMOS (Bipolar Complementary Metal-Oxide Semiconductor) technology or according to BCD (Bipolar-CMOS-DMOS) technology. DMOS technology includes Vertical Diffused MOS (VDMOS) and Lateral Diffused MOS (LD-MOS) techniques or any other microelectronic or discrete or hybrid component technology.

Note that depending on the particular embodiment adopted, the first electrode E1 and the second electrode E2 can be, respectively, an anode (capable of collecting electrons) or a cathode (capable of collecting gaps) or vice versa.

In the operation of detector 300, the capacitance $C_{DET}$ between electrodes E1 and E2 of the radiation sensor 100 is used as feedback capacitance for charge preamplifier 200 amplifier 201.

In this regard, it should be noted that in many known radiation sensors, particularly semiconductor sensors with completely deplated volume, the capacitance $C_{DET}$ of the sensor itself is adequately constant with respect to time, sensor bias voltage, charge signal and temperature. The Applicant has observed that this constancy therefore allows it to be used effectively as a charge-voltage conversion element in the charge preamplifier 200.

Considering the continuous regime, the bias voltage $V_{BIAS}$ supplied to the polarization terminal 105 is decoupled from the charge preamplifier 200 by the $C_{AC}$ coupling capacitor. The collection terminal 103, connected to the first electrode E1 of the radiation sensor 100 is brought to the same voltage assumed by input terminal 203 of the amplifier 201.

In variable regime, the bias voltage $V_{BIAS}$ supplied to the bias terminal 105 is applied to the first node N1 by the bias resistor $R_{AC}$, while the coupling capacitor $C_{AC}$ connects the output terminal OUT1 of the preamplifier 200 to the first node N1 of the radiation sensor 100. In this way the electrical charge $S_{CH}$ generated by the radiation (e.g. ionising radiation) and represented by the pulse current generator $I_{RAD}$ is integrated at the ends of the capacitance $C_{DET}$ of the sensor 100 (and optionally also on the capacitance $C_F$), thanks to the action of amplifier 201.

The integration of the charge signal $S_{CH}$ produces the first output signal $V_{OUT}$ on the first output terminal OUT1 or, if the second output terminal OUT2 is used, this integration returns the second output signal $V^{AC}_{OUT}$ on the second output terminal OUT2. The second output signal $V^{AC}_{OUT}$ has a trend similar to that of the first output signal $V_{OUT}$, except for the continuous component blocked by the additional coupling capacitor $C_{AC2}$.

The electrical charge generated by the radiation is then dispersed through the bias resistor $R_{AC}$ which, together with the coupling capacitor $C_{AC}$, defines the time constant ($C_{AC}*R_{AC}$) with which the radiation sensor 100 returns in static bias conditions.

FIG. 2 shows an example of the expected trend of voltage/current transients on the main terminals of the detection apparatus 300.

As an example, the generator $I_{RAD}$ produces deltiform current pulses I1, whose integral area (i.e. total charge) is proportional to the energy of the ionising radiation. This impulsive electric current I1, integrated by the charge preamplifier 200, provides the first output voltage $V_{OUT}$ on the first output terminal OUT1 having, for example, the step trend I2 shown in FIG. 2. The discharge of the capacitor $C_{DET}$, through the bias resistor $R_{AC}$, takes place, for example, according to the discharge trend I3.

It should be noted that the coupling capacitor $C_{AC}$ is chosen, advantageously, so as to have a sufficiently large capacitance value with respect to the capacitance $C_{DET}$ so as not to significantly modify the total capacitance constituted by the series of the two capacitors $C_{DET}$ and $C_{AC}$. As an example, the capacitance $C_{AC}$ is at least 10 times the value of the capacitance $C_{DET}$.

Also note that in applications where the capacitance $C_{DET}$ is too high compared to the desired feedback capacitance value, a capacitive divider (not shown) can be used at the output (for example, at the first output terminal OUT1) of charge preamplifier 200 in order to obtain an actual feedback capacitance value lower than $C_{DET}$.

Moreover, the resistance value of the bias resistor $R_{AC}$ is chosen sufficiently large (for example, so as to have a time constant $R_{AC}*C_{AC}$ at least 10 times greater than the signal processing time constant) so that a voltage step at the first N1 node does not cause—in the processing time of the charge signal $S_{CH}$—a current absorption by the bias resistor $R_{AC}$ such as to significantly modify the total charge present at the ends of the capacitor $C_{DET}$, which would be reflected in a deficit on the measured energy.

It should be noted that the electrical feedback component 202, if realised by means of the feedback resistor $R_F$, allows the continuous feedback loop of the amplifier 201 to be closed by biasing the second electrode E2 of the radiation sensor 100. Moreover, the feedback resistor $R_F$ helps to avoid saturation of the output dynamics of amplifier 201, through a return path for the charge accumulated at the ends of the feedback capacitor $C_F$ (if present), with a time constant equal to $\tau_F=R_F(C_F+C_{DET})$.

If the pulsed reset switch SW is used as electrical feedback component 202, this switch is closed, cyclically, to restore the nominal voltage value at the ends of the feedback capacitor $C_F$ (if present), avoiding the need to use the feedback resistor $R_F$, to which an electronic noise contribution is associated.

Note that since in the solution described above the capacitance $C_{DET}$ is incorporated in the feedback loop of the amplifier 201, the feedback capacitor $C_F$, connected between the second node N2 and the first output terminal OUT1, can be omitted thus obtaining a reduction in the input capacitance of the charge preamplifier 200.

The reduction in the input capacitance of charge preamplifier 200 allows a reduction in the equivalent noise charge (ENC) of the radiation sensor 100, with a consequent improvement in the energy resolution or time resolution of the detection apparatus 300 in which the charge preamplifier 200 is inserted.

In addition, the reduction of the input capacitance of the charge preamplifier 200 allows an increase of the feedback loop gain of the preamplifier itself, with a consequent increase in the stability over time of the charge/voltage conversion gain.

The reduction of the input capacitance of the charge preamplifier 200 also offers the advantage of an increase in the response rate for the reduction of up/down times in response to an input signal. The increased response rate allows the use of shorter signal processing times, with advantages in situations of h charge signal $S_{CH}$ with high arrival rate. It should be noted that, instead of reducing the feedback capacitance, it is possible to increase this total capacitance to a value equal to $C_{TOTF}=C_F+C_{DET}$, obtaining other advantageous effects. In fact, the increase in the total feedback capacitance involves an increase in the input dynamics, intended as the maximum amount of charge that can be accumulated at the ends of the feedback capacitor, of the charge preamplifier 200, with a consequent reduction in downtime due to reset intervals (if, for example, the feebaxk electrical component 202 is implemented by the pulsed reset switch SW), improving the performance of the detection apparatus 300 for high arrival rates. Furthermore, thanks to the increase in total feedback capacitance, the feedback factor applied to the input is increased, with a consequent increase in the closed-loop band of the charge preamplifier 200.

It should also be noted that, as described with reference to the second output terminal OUT2, the use of the radiation sensor 100 as integration capacitance for the charge preamplifier 200 allows the output voltage signal, proportional to the generated charge, to be taken directly from the power supply line that supplies the bias voltage $V_{BIAS}$.

In this way the first output terminal OUT1 can be removed obtaining a reduction in the number of interconnections, particularly advantageous in multi-channel systems. In this particular configuration it is possible to have, in the case of a continuous reset architecture, a detection apparatus having only three terminals, with a considerable gain in terms of "routing" and reliability of the interconnections in detection systems composed of large pixel matrixes. These three terminals can be: the third node N3 (connected both to the bias terminal 105 and to the second output OUT2 from which the second output signal $V^{AC}_{OUT}$ can be taken) and two power supply terminals of the detection apparatus 300.

Figure 3:
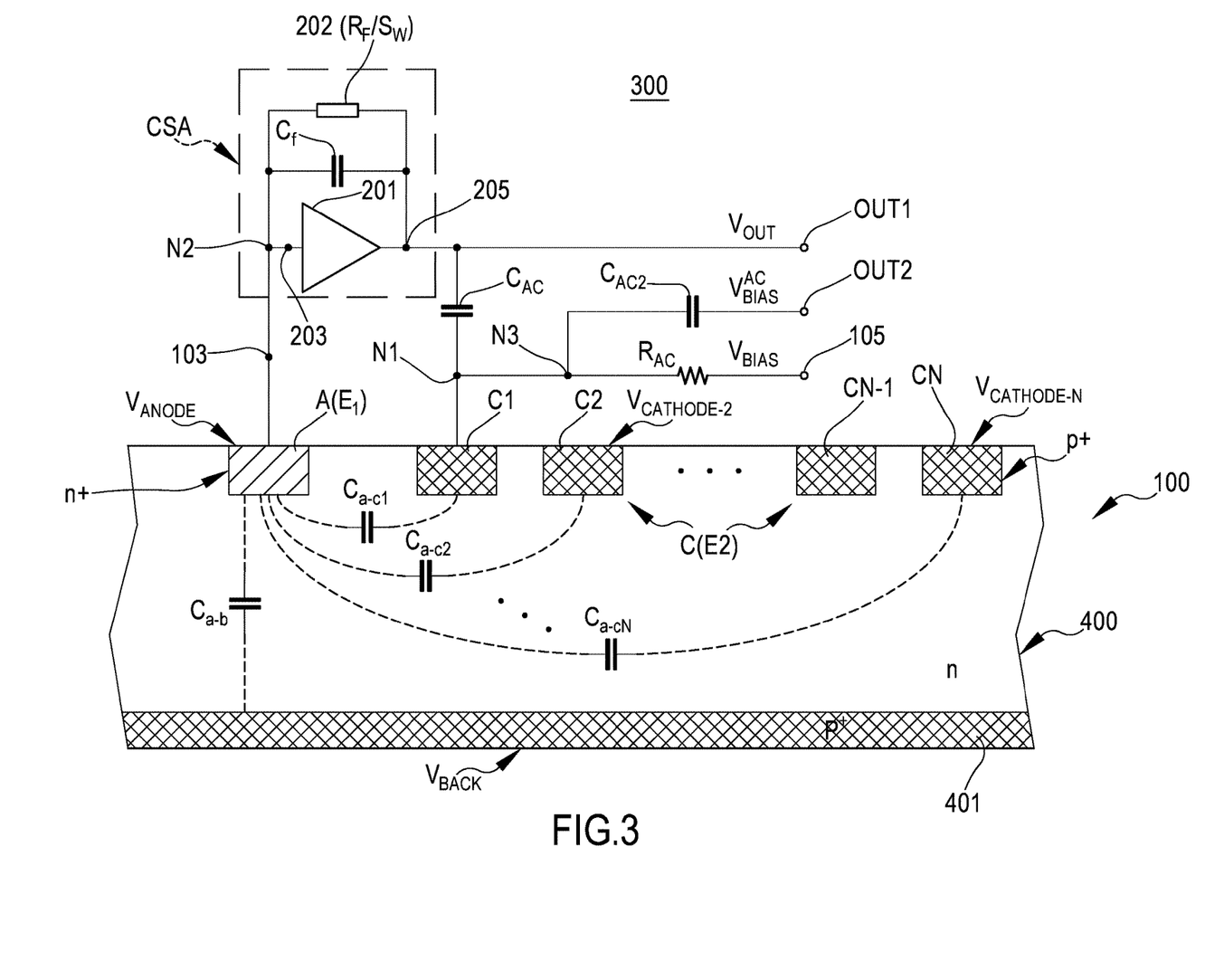
FIG. 3 shows the radiation detector apparatus and a section view of a particular radiation sensor.
Figure 4:
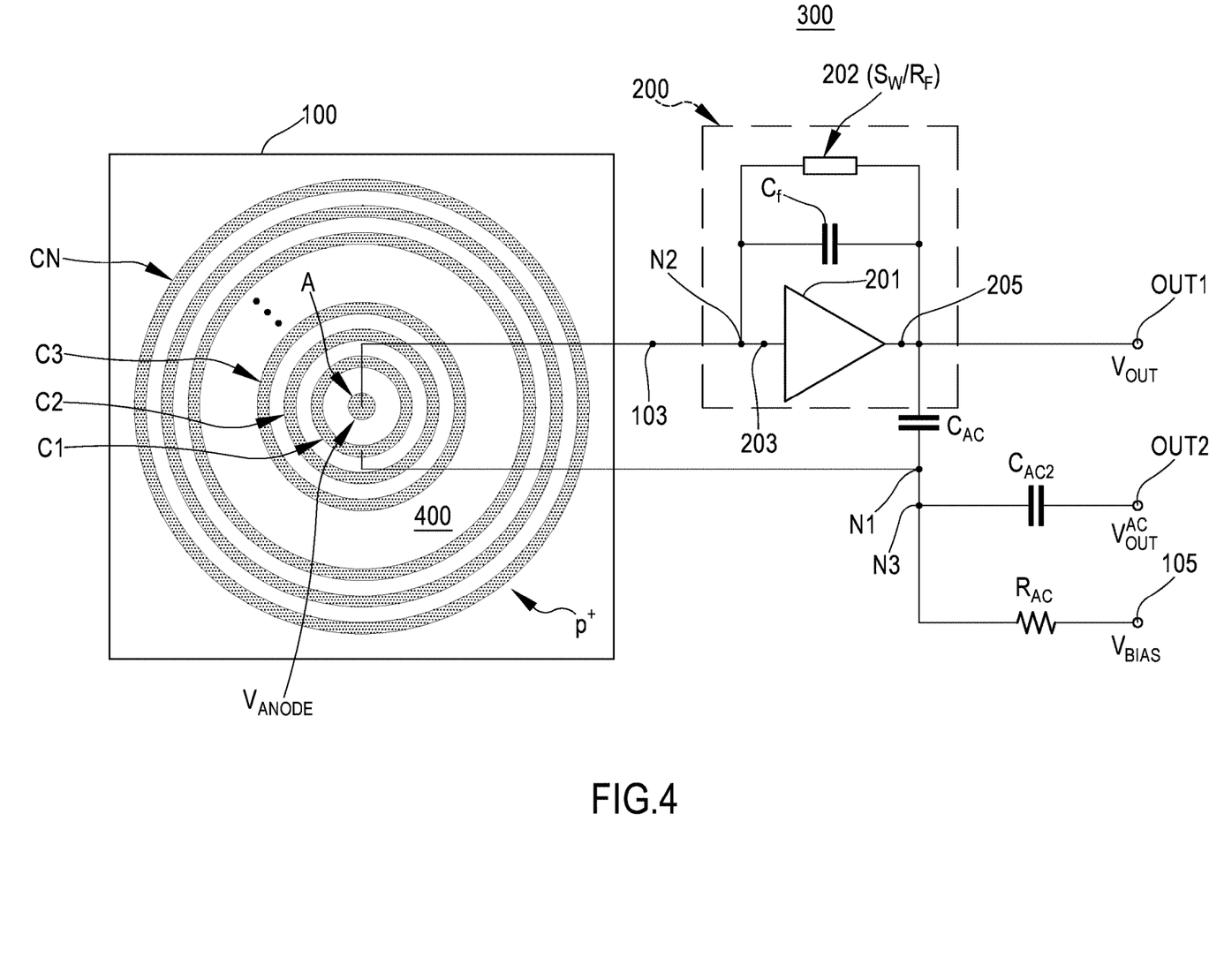
FIG. 4 shows the radiation detection apparatus and a plan view of the particular radiation sensor of FIG. 3.

FIGS. 3 and 4 shows the detection device 300 according to a particular embodiment in which an SDD silicon drift detector is used as radiation sensor 100. In these figures, the same numerical references as in the previous figures are used to identify identical or similar electrical or electronic components.

The radiation sensor SDD 100 comprises a substrate 400, e.g. made of silicon, doped according to a first type of conductivity (e.g. type n).

A heavily doped region with the first type of conductivity (e.g. n+) is integrated in the substrate 400. This region n+, which forms the anode A of the radiation sensor 100, corresponding to the first electrode E1 in FIG. 2, is electrically connected to the collection terminal 103 according to techniques known to the expert in the field. Anode A is biased by an additional bias voltage $V_{ANODE}$ provided by the input 203 of the amplifier 201.

The radiation sensor SDD 100 has a cathode structure C formed by a plurality of intensively doped C1-CN regions, with a second type of conductivity (e.g. p+) integrated, for example, on the same face of the substrate 400 on which anode A is integrated. As it appears from the view of FIG. 4, in the example described here, the cathode C1-CN regions surround the anode A region.

The region of the first cathode C1, is electrically connected to the first node N1 and then, via the third node N3 and the bias resistance $R_{AC}$, to the bias terminal 105 to receive the bias voltage $V_{BIAS}$. The other regions of cathode C2-CN are polarized, respectively, at voltages $V_{CATHODE-2}, \ldots, V_{CATHODE-N}$ via, for example, a voltage divider, not shown.

In one face of the substrate 400, opposite to the face in which the anode A and the cathodes C1-CN are integrated, there is a back region 401 (e.g., p+ type doped), maintained at a voltage $V_{BACK}$. The back region 401 performs a similar function to cathodes C1-CN for charge collection and depletion of the substrate 400. The back region 401 is normally the side exposed to radiation and represents the "input window" for radiation.

For example, typical values of the bias voltages for the radiation sensor SDD in FIGS. 3 and 4 are: $V_{ANODE}$ between 0 and +5V; $V_{BIAS}$ between −10 V and −40V; $V_{CATHODE-2}, \ldots, V_{CATHODE-N}$ between −40V and −180V; $V_{BACK}$ between −40V and −70V.

In operation of the radiation sensor SDD, an deplation region is created in the substrate 400 by suitably biasing the anode A, the cathodes C1-CN and the back region 401 so as to reduce the recombination of the charge carriers (holes and electrons) generated by the radiation. The holes generated in the substrate 400 are attracted by the C1-CN cathodes and the back cathode while the electrons are collected by the anode A.

FIG. 3 also shows the parasitic capacities $C_{a-c1}, \ldots, C_{a-cN}$ (between anode A and cathodes C1-CN) and $C_{a-b}$ (between anode A and back 401) which contribute to form the parasitic capacitance of the radiation sensor 100. The capacitance $C_{a-c1}$ relative to the first cathode C1 is the dominant one. For example, the capacitance $C_{a-c1}$ is in the order of 20-50 fF, the capacitance $C_{a-c2}$ is about 2-5 fF (the other capacitances decrease as moving away from anode A). The capacitance $C_{a-b}$ is in the order of 1 fF, for example.

In the case of FIG. 3, the capacitance $C_{a-c1}$ (relative to the first cathode C1) is the part of the capacitance $C_{DET}$ that is placed in feedback for the amplifier 201.

Moreover, the possibility of connecting one or more capacitances $C_{a-c2}, \ldots, C_{a-cN}$ to the third node N3 is not excluded, in addition to capacitance $C_{a-c1}$ in order to bring them in feedback to the amplifier 201, despite these capacitances Ca-c2, . . . , Ca-cN provide a negligible contribution.

The detection apparatus 300 can be advantageously used in all applications using charge preamplifiers combined with radiation detectors with a sufficiently stable capacitance $C_{DET}$.

In scientific applications, the detection apparatus 300 can be used, for example in nuclear and particle physics instrumentation (synchrotrons, accelerators, etc.), in astrophysics instrumentation or in medical and chemical instrumentation for radiography and spectroscopy.

In addition, the detection apparatus 300 can be used for: the control of food production for the detection of contaminants, for safety and control in the detection of explosives and explosives precursors, or for the analysis of materials by X-Ray Fluorescence (XRF).

In some of the above applications it is advantageous to use radiation sensors of the SDD type, of which an example has been described above, which require the use of a charge preamplifier and which, thanks to a very low capacitance $C_{DET}$ (for example, less than 100 fF), make it possible to achieve high performance in terms of signal-to-noise ratio.

REFERENCE SYMBOLS OF THE DRAWINGS detection apparatus 300
radiation sensor 100
first electrode E1
second electrode E2
charge preamplifier 200
SCH charge signal pulse generator 101
electric current pulses $I_{RAD}$
collection terminal 103
first node N1
bias resistor $R_{AC}$
bias terminal 105
voltage generator 106
direct bias voltage $V_{BIAS}$
amplifier 201
electrical discharge component 202
input terminal 203
output terminal 205
second node N2
SW pulsed reset switch
RF feedback resistor
first output voltage $V_{OUT}$
second output voltage $V_{AC}^{OUT}$
first output terminal OUT1
capacitor/capacitance $C_{DET}$
coupling capacitor $C_{AC}$
second output terminal OUT2
additional coupling capacitor $C_{AC2}$
current pulse I1
stepwise trend I2
discharge trend I3
anode A
cathode C
substrate 400
back region 401
cathodes C1-CN
additional bias voltage $V_{ANODE}$
voltages $V_{CATHODE-2}$-$V_{CATHODE-N}$
back voltage $V_{BACK}$

The invention claimed is:

1. A charge detecting apparatus comprising:
a radiation sensor having a first electrode and a second electrode for collecting charges of opposite sign and configured to provide to a collection terminal, connected to the first electrode, a charge signal proportional to an incident radiation, wherein the radiation sensor defines a sensor capacitance between said first and second electrode;
a charge preamplifier configured to receive the charge signal convert the charge signal into an output electrical signal and comprising an amplifier having a first output terminal;
an electrical connection between the first output terminal and the second electrode configured so that said sensor capacitance results in feedback for the amplifier;
wherein the charge preamplifier is configured to integrate the charge signal and convert the charge signal into a voltage output signal according to said sensor capacitance operating as integration capacitance.

2. The apparatus according to claim 1, wherein said electrical connection comprises a coupling capacitor connected between the first output terminal and a terminal of the radiation sensor connected to said second electrode.

3. The apparatus according to claim 2, further comprising a bias resistor connected between said terminal and a bias terminal of the radiation sensor.

4. The apparatus according to claim 1, wherein the charge preamplifier comprises: an input terminal connected to said collection terminal of the radiation sensor.

5. The apparatus according to claim 4, further comprising a discharge electrical component connected to the input terminal of the charge preamplifier.

6. The apparatus according to claim 5, wherein the discharge electrical component is further connected to first output terminal of the amplifier.

7. The apparatus according to claim 4, wherein the discharge electrical component is a component selected from: a feedback resistor; a pulsed reset switch, a discharge electrical network.

8. The apparatus according to claim 4, further comprising a feedback capacitor connected between the first output terminal and the input terminal.

9. The apparatus according to claim 1, wherein the charge preamplifier is provided with an output for the voltage output signal representing an integration of the charge signal; wherein said output coincides with said first output terminal.

10. The apparatus (300) according to claim 3, wherein the apparatus is provided with a second output terminal for the voltage output signal; wherein the second output terminal is connected to a node interconnected between the bias resistor and the terminal of the radiation sensor.

11. The apparatus according to claim 10, further comprising a coupling capacitor connected to the second output terminal and configured to block a direct component in said voltage output signal.

12. The apparatus according to claim 1, wherein said second electrode of the radiation sensor comprises a plurality of second electrodes; and wherein said sensor capacitance is associated with at least one electrode of the plurality of second electrodes.

13. The apparatus according to claim 12, wherein said sensor capacitance is between 20 fF and 50 fF.

14. The apparatus according to claim 1, wherein said radiation sensor is a sensor selected from the group comprising of a semiconductor drift detector and a pixel detector.

15. The apparatus according to claim 1, wherein said amplifier is made according one technology selected from the group comprising CMOS technology, BiCMOS technology, BCD technology, and discrete component technology.

* * * * *